(12) United States Patent
Miyamoto et al.

(10) Patent No.: US 9,840,589 B2
(45) Date of Patent: Dec. 12, 2017

(54) POLYIMIDE PRECURSOR COMPOSITION AND METHOD OF PREPARING POLYIMIDE PRECURSOR COMPOSITION

(71) Applicant: FUJI XEROX CO., LTD., Tokyo (JP)

(72) Inventors: Tsuyoshi Miyamoto, Kanagawa (JP); Tomoya Sasaki, Kanagawa (JP); Kana Miyazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/008,586

(22) Filed: Jan. 28, 2016

(65) Prior Publication Data

US 2017/0066883 A1 Mar. 9, 2017

(30) Foreign Application Priority Data

Sep. 9, 2015 (JP) .................. 2015-177876

(51) Int. Cl.
| | | |
|---|---|---|
| C09K 19/56 | (2006.01) | |
| C08K 5/34 | (2006.01) | |
| C08K 5/3445 | (2006.01) | |
| C08G 73/10 | (2006.01) | |

(52) U.S. Cl.
CPC .................. C08G 73/10 (2013.01)

(58) Field of Classification Search
None
See application file for complete search history.

(56) References Cited

U.S. PATENT DOCUMENTS

| | | | |
|---|---|---|---|
| 4,238,528 A | 12/1980 | Angelo et al. | |
| 5,466,732 A | 11/1995 | Tomioka et al. | |
| 5,907,005 A | 5/1999 | Shimizu | |
| 6,399,669 B1 | 6/2002 | Suzuki et al. | |
| 2009/0194737 A1* | 8/2009 | Lai .................... | C08G 73/1042 252/299.4 |
| 2010/0207293 A1 | 8/2010 | Nakayama et al. | |
| 2011/0059305 A1 | 3/2011 | Kaneya et al. | |
| 2013/0053513 A1* | 2/2013 | Tsai .................. | G02F 1/133711 524/592 |
| 2013/0230724 A1 | 9/2013 | Miyamoto et al. | |
| 2014/0137735 A1 | 5/2014 | Bhandari et al. | |

FOREIGN PATENT DOCUMENTS

| | | |
|---|---|---|
| JP | H04-81167 B2 | 12/1992 |
| JP | H06-001915 A | 1/1994 |
| JP | H06-293834 A | 10/1994 |
| JP | H07-310048 A | 11/1995 |
| JP | H07-324163 A | 12/1995 |
| JP | H08-165346 A | 6/1996 |
| JP | H10-081749 A | 3/1998 |
| JP | H10-195295 A | 7/1998 |
| JP | H10-204437 A | 8/1998 |
| JP | 2003-074587 A | 3/2003 |
| JP | 2009-037222 A | 2/2009 |
| JP | 2009-091573 A | 4/2009 |
| JP | 2010-168517 A | 8/2010 |
| JP | 2011-043801 A | 3/2011 |
| JP | 2013-101303 A | 5/2013 |
| JP | 2013-101304 A | 5/2013 |
| JP | 2013-127597 A | 6/2013 |
| JP | 2014-063133 A | 4/2014 |
| WO | 03/074587 A1 | 9/2003 |

OTHER PUBLICATIONS

Sci-Finder information sheet for butylactone and cyclohexanone, p. 1-2.*
U.S. Appl. No. 15/243,030, filed Aug. 22, 2016 in the name of Miyamoto et al.
Oct. 5, 2017 Office Action issued in U.S. Appl. No. 15/243,030.

* cited by examiner

*Primary Examiner* — Robert T Butcher
(74) *Attorney, Agent, or Firm* — Oliff PLC

(57) ABSTRACT

A polyimide precursor composition includes a mixed solvent and a polyimide precursor dissolved in the mixed solvent, and the mixed solvent contains at least one organic solvent A and at least one organic solvent B, wherein the organic solvent A is selected from the group consisting of an aprotic polar solvent which contains a nitrogen atom and a lactone solvent, and the organic solvent B is selected from the group consisting of a non-aqueous solvent which has a carbonyl structure.

21 Claims, No Drawings

POLYIMIDE PRECURSOR COMPOSITION AND METHOD OF PREPARING POLYIMIDE PRECURSOR COMPOSITION

CROSS-REFERENCE TO RELATED APPLICATIONS

This application is based on and claims priority under 35 USC 119 from Japanese Patent Application No. 2015-177876 filed Sep. 9, 2015.

BACKGROUND

1. Technical Field

The present invention relates to a polyimide precursor composition and a method of preparing the polyimide precursor composition.

2. Related Art

A polyimide resin is a material having high durability and excellent heat resistance, and is widely used as an electronic material.

SUMMARY

According to an aspect of the invention, there is provided a polyimide precursor composition which includes a mixed solvent and a polyimide precursor dissolved in the mixed solvent, the mixed solvent containing at least one organic solvent A and at least one organic solvent B, wherein the organic solvent A is selected from the group consisting of an aprotic polar solvent which contains a nitrogen atom and a lactone solvent, and the organic solvent B is selected from the group consisting of a non-aqueous solvent which has a carbonyl structure.

DETAILED DESCRIPTION

Hereinafter, exemplary embodiments of the invention will be described in detail.

Polyimide Precursor Composition

A polyimide precursor composition according to this exemplary embodiment is obtained by dissolving a polyimide precursor in a mixed solvent. The mixed solvent contains at least one organic solvent A and at least one organic solvent B. The organic solvent A (referred to as "an organic solvent of a solvent group A" below) is selected from the group consisting of an aprotic polar solvent which contains nitrogen atoms and a lactone solvent. The organic solvent B (referred to as "an organic solvent of a solvent group B" below) is selected from the group consisting of a non-aqueous solvent which has a carbonyl structure. Dissolution means a state where a residue of dissolved material is not visually confirmed.

With such a configuration, whitening is prevented in the polyimide precursor composition according to this exemplary embodiment. The whitening occurs on a surface (referred to as "a surface" below) of the polyimide precursor composition which comes into contact with air when a polyimide molded article is molded. The reason of prevention is presumed as follows.

From the related art, each organic solvent of the solvent group A has been known as a good solvent for individually dissolving a polyimide precursor. However, if a single organic solvent of the solvent group A is applied, whitening may occur on a surface of a polyimide precursor composition coating film after a base is coated with the polyimide precursor composition. It is considered that this is because of the following reasons. That is, the organic solvent of the solvent group A is hydrophilic and thus the polyimide precursor composition adsorbs and absorbs moisture contained in the atmosphere of a working environment (molding process of the polyimide molded article and the like), under the atmosphere of the working environment. The concentration of moisture on the surface of the polyimide precursor composition coating film is increased, and thus the polyimide precursor is precipitated. Since a surface portion of a part at which whitening occurs in this manner is resinificated during a heat treatment, a solvent in the coated film or water generated in imidization is enclosed. Thus, when the solvent or the water is evaporated, the solvent or the water breaks through the surface portion, and this is a reason of occurrence of a void-shaped defect busting through the surface portion. Since hardening proceeding methods for the surface portion where whitening occurs, and a normal portion are different from each other, surface defects such as film thickness abnormality and swelling are shown.

Use of a mixed solvent containing the organic solvent of the solvent group A which is a good solvent, and a poor solvent, for improving film preparation properties (coating properties) of the composition has been known. The poor solvent is a solvent which singly has difficulty in dissolving the polyimide precursor. As an example, a hydrophilic organic solvent (for example, butyl cellosolve (BC) or the like) may be used as the poor solvent, in addition to the hydrophilic organic solvent of the solvent group A. The hydrophilic organic solvent is added, and thus a contact angle on the base of the polyimide precursor composition is reduced and the leveling performance on the base is improved. However, when the hydrophilic organic solvent is added, the moisture in the atmosphere of the working environment is more easily adsorbed and absorbed. Thus, whitening may occur on a surface of the polyimide molded article.

As the poor solvent used along with the organic solvent of the solvent group A which is the good solvent, the organic solvent of the solvent group B is used. The organic solvent of the solvent group B is used along with the organic solvent of the solvent group A which is the good solvent, and thus solubility and dispersion stability of the polyimide precursor are improved. Since the organic solvent of the solvent group B is a solvent which has high hydrophobicity and is water-insoluble, absorption of the moisture in the polyimide precursor composition is prevented under the atmosphere of the working environment (molding process of the polyimide molded article and the like). Thus, it is considered that liquid characteristics of the polyimide molded article, such as viscosity are changed, adsorption and absorption of the moisture in the atmosphere of the environment is prevented, precipitation of the polyimide precursor is prevented, and occurrence of a state (which is a cause of the whitening) of "precipitation on a surface of a coating film of a polyimide precursor resin" is prevented.

From the above descriptions, it is considered that whitening on the surface of the polyimide molded article is prevented in the polyimide precursor composition according to this exemplary embodiment.

In the polyimide precursor composition according to this exemplary embodiment, the mixed solvent of the organic solvent of the solvent group A and the organic solvent of the solvent group B is used, and thus a change of liquid characteristics such as viscosity, due to absorption of moisture by the polyimide precursor composition is prevented. Thus, the polyimide precursor composition according to this exemplary embodiment is excellent in film preparation properties (coating properties) and preservation stability. Particularly, even when a composition (coating liquid) is stirred while being exposed under an air atmosphere, as in a roll type coating device and the like, an increase of viscosity of the composition is difficult, and stable film preparation (coating) is performed. That is, even when the composition is stored for a long period of time, film preparation using the stored composition, which is similar to film preparation using a newly prepared composition is performed.

In the polyimide precursor composition according to this exemplary embodiment, the mixed solvent of the organic solvent of the solvent group A and the organic solvent of the solvent group B is used, and thus excessive flowability is prevented. Thus, even when a film is prepared on a curved surface or a vertical section, sagging of the composition is prevented. Cissing which may be caused by liquidity aggregation is also prevented. As a result, a polyimide molded article having a substantially uniform film thickness is easily obtained.

In the polyimide precursor composition according to this exemplary embodiment, the mixed solvent of the organic solvent of the solvent group A and the organic solvent of the solvent group B is used, and thus dissolution which is stable at a high concentration is provided even with respect to an aromatic polyimide precursor (polyimide precursor using an aromatic compound as at least one of tetracarboxylic dianhydride and the diamine compound). Thus, a polyimide molded article which is excellent in various characteristics such as mechanical strength, heat resistance, an electrical characteristic, and solvent-resistance is easily obtained. The amount of the solvent is reduced and an environmental load is also reduced. Thus, preparation of a film having a thick thickness is easily performed by using a polyimide precursor composition having a polyimide precursor at a high concentration.

Hereinafter, components of the polyimide precursor composition according to this exemplary embodiment will be described.

Polyimide Precursor

The polyimide precursor is a polymer (polyamic acid) of tetracarboxylic dianhydride and a diamine compound.

As the tetracarboxylic dianhydride, a compound of either of aromatic series and aliphatic series is exemplified. However, the aromatic compound may be used as the tetracarboxylic dianhydride. That is, a tetravalent organic group represented by A in Formulas (I-1) to (I-3) (which will be described later) may be an aromatic organic group.

Examples of aromatic tetracarboxylic dianhydride include pyromelletic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl-diphenyl silane tetracarboxylic dianhydride, 3,3',4,4'-tetra phenylsilane tetracarboxylic dianhydride, 1,2,3,4-furan tetracarboxylic dianhydride, 4,4'-bis(3,4-dicarboxy phenoxy)diphenyl sulfide dianhydride, 4,4'-bis(3,4-dicarboxy phenoxy)diphenyl sulfone dianhydride, 4,4'-bis(3,4-dicarboxy phenoxy)diphenyl propane dianhydride, 3,3',4,4'-perfluoro isopropylidenediphthalic dianhydride, 3,3',4,4'-biphenyl tetracarboxylic dianhydride, 2,3,3',4'-biphenyl tetracarboxylic dianhydride, bis(phthalic acid)phenylphosphine oxide dianhydride, p-phenylene-bis(triphenyl phthalic acid)dianhydride, m-phenylene-bis(triphenyl phthalic acid) dianhydride, bis(triphenyl phthalic acid)-4,4'-diphenyl ether dianhydride, bis(triphenyl phthalic acid)-4,4'-diphenylmethane dianhydride.

Examples of aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tri-carboxy cyclopentyl acetic dianhydride, 3,5,6-tri-carboxy norbonane-2-acetic acid dianhydride, 2,3,4,5-tetrahydrofuran tetracarboxylic dianhydride, 5-(2,5-di-oxo-tetrahydrofuryl)-3-methyl-3-cyclohexene-1,2-dicarboxylic acid dianhydride, bicyclo[2,2,2]-oct-7-ene-2,3,5,6-tetracarboxylic dianhydride; aliphatic tetracarboxylic dianhydride having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these substances, aromatic tetracarboxylic dianhydride may be used as tetracarboxylic dianhydride. Specifically, for example, pyromelletic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, and 3,3',4,4'-benzophenone tetracarboxylic dianhydride may be used. Pyromelletic dianhydride, 3,3',4,4'-biphenyl tetracarboxylic dianhydride, and 3,3',4,4'-benzophenone tetracarboxylic dianhydride may be further used. 3,3',4,4'-tetracarboxylic dianhydride may be particularly used.

One type of tetracarboxylic dianhydride may be used singly or combination of two or more types of tetracarboxylic dianhydride may be used together.

When combination of two or more types of tetracarboxylic dianhydride is used together, aromatic tetracarboxylic dianhydride or aliphatic tetracarboxylic acid may be used, or combination of aromatic tetracarboxylic dianhydride and aliphatic tetracarboxylic dianhydride may be used.

The diamine compound is a diamine compound having two amino groups in a molecular structure. An example of the diamine compound includes a compound of either of aromatic series and aliphatic series. However, an aromatic compound may be used. That is, a bivalent organic group represented by B in Formulas (I-1) to (I-3) (which will be described later) may be an aromatic organic group.

Examples of the diamine compound include aromatic diamine such as p-phenylenediamine, m-phenylenediamine, 4,4'-diaminodiphenylmethane, 4,4'-diaminodiphenyl ethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diamino biphenyl, 5-amino-1-(4'-amino phenyl)-1,3,3-trimethyl-indane, 6-amino-1-(4'-amino phenyl)-1,3,3-trimethyl-indane, 4,4'-diamino benzanilide, 3,5-diamino-3'-trifluoromethyl benzanilide, 3,5-diamino-4'-trifluoromethyl benzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diamino biphenyl, 2,2'-dichloro-4,4'-diamino-5,5'-dimethoxy biphenyl, 3,3'-dimethoxy-4,4'-diamino biphenyl, 4,4'-diamino-2,2'-bis(trifluoromethyl) biphenyl, 2,2-bis[4-(4-aminophenoxy) phenyl]propane, 2,2-bis[4-(4-aminophenoxy) phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene) bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamine such as diaminodiphenyl tetraphenyl thiophene, which has two amino groups bonded to an aromatic ring and hetero atoms other than a nitrogen atom of the amino group; aliphatic diamine and alicyclic diamine such as 1,1-metaxylylene diamine, 1,3-propane diamine, tetramethylene diamine, pentamethylene diamine, octamethylene diamine, nonamethylene diamine, 4,4-diamino heptamethylene diamine, 1,4-diamino cyclohexane, isophorone diamine, tetrahydrodicyclopentadienylene diamine, hexahydro-4,7-metanoindanylene dimethylene diamine, and trycyclo[6,2,1,0$^{2.7}$]-undecylene dimethyl diamine, and 4,4'-methylenebis (cyclohexylamine).

Among these substances, the aromatic diamine compound may be used as the diamine compound. Specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diamino-diphenyl sulfone may be used. 4,4'-diaminodiphenyl ether and p-phenylenediamine may be particularly used.

One type of the diamine compound may be used singly or combination of two or more types of diamine compounds may be used together. When combination of two or more types of the diamine compound is used together, an aromatic diamine compound or an aliphatic diamine compound may be used, or combination of the aromatic diamine compound and the aliphatic diamine compound may be used.

A specific example of the polyimide precursor includes a resin having a constituent unit represented by Formula (I-1), Formula (I-2), and Formula (I-3).

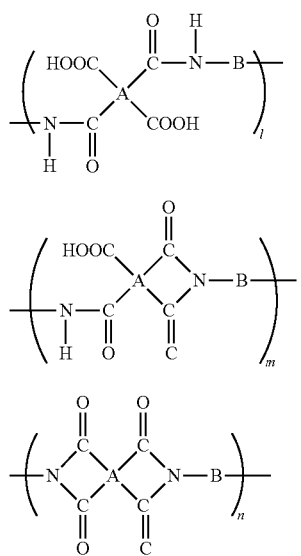

In the formula (I-1), the formula (I-2), and the formula (I-3), A indicates a tetravalent organic group and B indicates a bivalent organic group.

l, m, and n respectively indicate integers of 0 or more. l, m, and n preferably satisfy a relationship of $(2n+m)/(2l+2m+2n) \leq 0.2$. Here, at least one of l and m indicates an integer of one or more.

In the formulas (I-1) to (I-3), the tetravalent organic group represented by A may be a residual group obtained by removing four carboxyl groups from tetracarboxylic dianhydride which is a raw material.

The bivalent organic group represented by B may be a residual group obtained by removing two amino groups from the diamine compound which is a raw material.

In the formulas (I-1) to (I-3), l, m, and n respectively indicate integers of 0 or more. However, it may be preferable that l, m, and n respectively indicate integers from 0 to 200. It may be more preferable that l, m, and n respectively indicate integers from 0 to 100.

l, m, and n preferably satisfy a relationship of $(2n+m)/(2l+2m+2n)$ 50.2. However, l, m, and n more preferably satisfy a relationship of $(2n+m)/(2l+2m+2n) \leq 0.15$, and further preferably satisfy a relationship of $(2n+m)/(2l+2m+2n)$ Here, at least one of l and m indicates an integer of one or more.

Here, "$(2n+m)/(2l+2m+2n)$" indicates a ratio of the number of bonding parts $(2n+m)$ subjected to imide ring closure, to the number of all bonding parts $(2l+2m+2n)$ among bonding parts of the polyimide precursor (reaction parts of tetracarboxylic dianhydride and the diamine compound). That is, "$(2n+m)/(2l+2m+2n)$" indicates an imidization rate.

Accordingly, "$(2n+m)/(2l+2m+2n)$" is set to satisfy a relationship of 0.2 or less, that is, the imidization rate of the polyimide precursor is set to be equal to or less than 0.2, and thus occurrence of gelling of the polyimide precursor or occurrence of precipitating and separating of resin is prevented.

The imidization rate (value of "$(2n+m)/(2l+2m+2n)$") of the polyimide precursor is measured by the following method.

Measurement of Imidization Rate of Polyimide Precursor
Preparation of Polyimide Precursor Sample (i) A silicone wafer is coated with a polyimide precursor composition to be measured so as to have a film thickness of a range of 1 μm to 10 μm, and thereby a coated film sample is prepared.

(ii) The coated film sample is immersed in tetrahydrofuran (THF) for 20 minutes and a solvent in the coated film sample is substituted with tetrahydrofuran (THF). The immersed solvent is not limited to THF. A solvent which does not dissolve the polyimide precursor and may be mixed with a solvent component included in the polyimide precursor composition may be selected. Specifically, an alcohol solvent such as methanol and ethanol, and an ether compound such as dioxane may be used.

(iii) The coated film sample is extracted from THF, and THF adhering to the surface of the coated film sample is removed by spraying $N_2$ gas. The coated film sample obtained through treatment under reduced pressure of 10 mmHg or less at a temperature range of 5° C. to 25° C. for 12 hours or longer is dried, and thereby the polyimide precursor sample is prepared.

Preparation of 100% Imidized Standard Sample (iv) Similarly to the (i), a silicone wafer is coated with a polyimide precursor composition to be measured and thereby a coated film sample is prepared.

(v) An imidization reaction is performed by heating the coated film sample at 380° C. for 60 minutes, and thereby a 100% imidized standard sample is prepared.

Measurement and Analysis (vi) Infrared absorption spectra of the 100% imidized standard sample and the polyimide precursor sample are measured by a Fourier transform infrared spectrophotometer (FT-730 manufactured by HORIBA, Ltd.). A ratio I' (100) of an absorption peak (Ab' (1780 cm$^{-1}$)) derived from imide bonds in the vicinity of 1780 cm$^{-1}$ to an absorption peak (Ab' (1500 cm$^{-1}$)) derived from an aromatic ring in the vicinity of 1500 cm$^{-1}$ of the 100% imidized standard sample is obtained.

(vii) Similarly, the polyimide precursor sample is measured and thus a ratio I(x) of an absorption peak (Ab (1780 cm$^{-1}$)) derived from imide bonds in the vicinity of 1780 cm$^{-1}$ to an absorption peak (Ab (1500 cm$^{-1}$)) derived from an aromatic ring in the vicinity of 1500 cm$^{-1}$ is obtained.

An imidization rate of the polyimide precursor is calculated based on the following expressions by using the measured absorption peaks I' (100) and I(x).

Expression: imidization rate of polyimide precursor=$I(x)/I'$ (100)

Expression: $I'(100)=(Ab'\ (1780\ cm^{-1}))/(Ab'\ (1500\ cm^{-1}))$

Expression: $I(x)=(Ab\ (1780\ cm^{-1}))/(Ab\ (1500\ cm^{-1}))$

Measurement of the imidization rate of this polyimide precursor is applied to measurement of an imidization rate of an aromatic polyimide precursor. When an imidization rate of an aliphatic polyimide precursor is measured, a peak derived from a structure which is not changed before and after the imidization reaction is used as an internal standard peak, instead of an absorption peak of the aromatic ring.

Ratio of Tetracarboxylic Dianhydride and Diamine Compound

In the polyimide precursor, the molar equivalent number of the diamine compound may be greater than the molar equivalent number of tetracarboxylic dianhydride. Thus, preservation stability of the polyimide precursor composition is easily improved. A polyimide molded article having high mechanical strength is easily obtained.

The molar equivalent of the diamine compound used during a polymerization reaction is preferably set to be excessively greater than the molar equivalent of tetracarboxylic dianhydride. The ratio of the molar equivalents of the diamine compound and the tetracarboxylic dianhydride is a value of the molar equivalent of tetracarboxylic dianhydride if the molar equivalent of the diamine compound is set to 1. This ratio is preferably in a range from 0.900 to 0.999, and more preferably in a range from 0.950 to 0.990.

If the ratio of the molar equivalents of tetracarboxylic dianhydride and the diamine compound is equal to or greater than 0.900, mechanical strength of a molded article is easily improved. If the ratio of the molar equivalents is equal to or greater than 0.950, the molecular weight of the polyimide precursor is increased. For example, when a film-shaped polyimide molded article is used, film strength (tear strength and tensile strength) of the film-shaped polyimide molded article is easily improved.

Here, the molar equivalent of the diamine compound and the molar equivalent of tetracarboxylic dianhydride in the polyimide precursor are measured as follows. The polyimide precursor resin is decomposed into a diamine compound and a tetracarboxylic acid salt by performing hydrolysis treatment in a basic solution such as sodium hydroxide and potassium hydroxide. The obtained sample is analyzed by using gas chromatography, liquid chromatography, or the like, and thus a ratio of tetracarboxylic dianhydride and the diamine compound constituting the polyimide precursor is determined.

Terminal Structure of Polyimide Precursor

The polyimide precursor may include a polyimide precursor (resin) having an amino group at a terminal thereof. Preferably, a polyimide precursor having amino groups at all terminals may be included. Thus, preservation stability of the polyimide precursor composition is easily improved. A polyimide molded article having high mechanical strength is easily obtained.

If the polyimide precursor (resin) having the amino group at the terminal thereof is included, mechanical strength of the polyimide molded article is easily improved. Dispersion of various fillers added for applying various functions to the polyimide molded article is accelerated, and the high function is easily expressed even when the small quantity of the filler is used.

Some or all of terminal amino groups of the polyimide precursor which has amino groups at the terminal may be sealed by using dicarboxylic anhydride and the like. If the terminal amino groups are sealed, preservation stability of the polyimide precursor composition is easily improved.

An example of dicarboxylic anhydride used in sealing of the terminal amino groups includes phthalic anhydride, fumaric anhydride, and the like.

The terminal amino group of the polyimide precursor is detected by acting the polyimide precursor composition with trifluoroacetic anhydride (quantitative reaction with amino group). That is, the terminal amino group of the polyimide precursor is imidized by using trifluoro acetic acid. After treatment, the polyimide precursor is refined through repre-cipitation or the like, and thus surplus trifluoroacetic anhydride and a trifluoro acetic acid residue are removed. An amount of the treated polyimide precursor is determined by a nuclear magnetic resonance (NMR) method, and thus the quantity of the terminal amino groups of the polyimide precursor is measured.

Number Average Molecular Weight of Polyimide Precursor

The number average molecular weight of the polyimide precursor may be from 1,000 to 100,000, preferably is from 5,000 to 50,000, and more preferably is from 10,000 to 30,000. If the number average molecular weight of the polyimide precursor is in the above range, deterioration of solubility of the polyimide precursor to the solvent is prevented and film forming characteristics is easily ensured.

Particularly, if the number average molecular weight of the polyimide precursor is equal to or greater than 2,000 (preferably equal to or greater than 10,000, and more preferably equal to or greater than 15,000), the mechanical strength of the molded article is easily improved. Since the solubility of the composition is high even when the number average molecular weight of the polyimide precursor is equal to or greater than 2,000, whitening on the surface of the polyimide molded article is prevented.

The ratio of the molar equivalents of the tetracarboxylic dianhydride and the diamine compound is adjusted, and thus a polyimide precursor having a desired number average molecular weight is obtained.

The number average molecular weight of the polyimide precursor is measured by using a gel permeation chromatography (GPC) method having the following measurement conditions.

Column: TSKgela-M (manufactured by Tosoh Corporation) (7.8 mm, I.D×30 cm)

Eluent: DMF (dimethylformamide)/30 mM LiBr/60 mM phosphoric acid

Flow speed: 0.6 mL/min

Injection volume: 60 μL

Detector: RI (differential refractive index detector)

Content of Polyimide Precursor

A content (concentration) of the polyimide precursor may be from 0.1% by weight to 40% by weight for the entirety of the polyimide precursor composition, preferably from 0.5% by weight to 25% by weight, and more preferably from 1% by weight to 20% by weight.

Particularly, even when the polyimide precursor has high concentration, that is, the content of the polyimide precursor is from 15% by weight to 25% by weight, whitening on the surface of the polyimide molded article is prevented.

Mixed Solvent

The mixed solvent contains at least one organic solvent A (organic solvent of solvent group A) and at least one organic solvent B (organic solvent of solvent group B). The organic solvent A is selected from a solvent group consisting of an aprotic polar solvent which contains nitrogen atoms, and a lactone solvent. The one or more types of organic solvents B are selected from a solvent group formed from a non-aqueous solvent having a carbonyl structure.

The organic solvent of the solvent group A will be described.

As the aprotic polar solvent containing the nitrogen atom, a solvent having a dipole moment of 3.0 D to 5.0 D may be used.

As the aprotic polar solvent containing the nitrogen atoms, N-methyl-2-pyrrolidone (NMP: boiling point 202° C.), N-ethyl-2-pyrrolidone (NEP: boiling point 218° C.), a 1,3-dimethyl-2-imidazolidinone (DMI: boiling point 220° C.), 3-methoxy-N,N-dimethylpropanamide (MDMPA: boiling point 215° C.), and 3-methoxy-N,N-dibutylpropanamide (MDBPA: boiling point 252° C.) are exemplified.

The lactone solvent is a solvent having a cyclic ester structure which includes an ether group (—O—) and a carbonyl group (C=O) (specifically, cyclic ester structure) including "—O—C(=O)-group".

An example of the lactone solvent includes a solvent having any one of a three-membered ring to an eight-membered ring (preferably, from a five-membered ring to a seven-membered ring).

An example of the lactone solvent includes an unsubstituted lactone and a substituted lactone. An example of the substituted lactone includes a substituted lactone obtained by performing substitution with at least one type which is selected from an alkyl group (for example, a straight-chain, branched, or cyclic alkyl group having a carbon number of 1 to 10), an alkoxy group (for example, a straight-chain or branched alkoxy group having a carbon number of 1 to 10), an acyl group (for example, a straight-chain or branched acyl group having a carbon number of 1 to 10), an aryl group (for example, a phenyl group and the like), and an aralkyl group (for example, a benzyl group and the like).

A specific example of the lactone solvent includes γ-butyrolactone (γ-BL: boiling point 202° C.), γ-valerolactone (γ-VL: boiling point 207° C.), δ-valerolactone (δ-VL: boiling point 230° C.), ε-caprolactone (ε-Cl: boiling point 237° C.), β-propiolactone (boiling point: 162° C.), and α-acetyl-γ-butyrolactone (boiling point 107° C./5 mmHg).

Among these substances, from the viewpoint of prevention of whitening on the surface of the polyimide molded article, improvement of preservation stability, improvement of film forming characteristics, and the like, the organic solvent of the solvent group A is preferably one or more types of organic solvents selected from a solvent group which is formed from 1,3-dimethyl-2-imidazolidinone, 3-methoxy-N,N-dimethylpropanamide, 3-methoxy-N,N-dibutylpropanamide, γ-butyrolactone, γ-valerolactone, δ-valerolactone, and ε-caprolactone. This is because the organic solvent of the solvent group A has high solubility for the polyimide precursor.

The organic solvent of the solvent group B will be described.

An example of the non-aqueous solvent having a carbonyl structure includes a ketone solvent, a carbonate solvent, and the like. These solvents are classified into organic solvents having a chain structure or a cyclic structure.

An example of the chain ketone solvent includes a solvent having an alkyl chain of a carbon number of 2 to 20 (preferably carbon number of 3 to 10). Specifically, methyl ethyl ketone (MEK: boiling point 80° C.), methyl isobutyl ketone (MIBK: boiling point 116° C.), diisobutyl ketone (DIBK: boiling point 168° C.), and the like are exemplified.

An example of the cyclic ketone solvent includes a solvent having a ring of a four-membered ring to an eight-membered ring (preferably, from a five-membered ring to a six-membered ring). Specifically, cyclohexanone (CH: boiling point 154° C.), cyclopentanone (CP: boiling point 131° C.), isophorone (IP: boiling point 215° C.), and the like are exemplified.

An example of the chain carbonate solvent includes a solvent having an alkyl chain of a carbon number of 2 to 20 (preferably carbon number of 3 to 10). Specifically, dimethyl carbonate (DMC: boiling point 90° C.), diethyl carbonate (DEC: boiling point 126° C.), dipropyl carbonate (DPC: boiling point 167° C.), di-t-butyl carbonate (DtB: boiling point 56° C.), and the like are exemplified.

An example of the cyclic carbonate solvent includes a solvent having a ring of a four-membered ring to an eight-membered ring (preferably, from a five-membered ring to a six-membered ring). Specifically, propylene carbonate (PC: boiling point 240° C.), ethylene carbonate (EC: boiling point: 261° C.), and the like are exemplified.

Among these substances, from the viewpoint of prevention of whitening on the surface of the polyimide molded article, improvement of preservation stability, improvement of film forming characteristics, and the like, the organic solvent of the solvent group B is preferably one or more types of organic solvents selected from a solvent group which is formed from a cyclic ketone solvent and a cyclic carbonate solvent. The organic solvent of the solvent group B is more preferably one or more types of organic solvents selected from a solvent group which is formed from cyclohexanone, cyclopentanone, and isophorone. This is because the organic solvent of the solvent group B easily dissolves the polyimide precursor even when the large quantity of the organic solvent of the solvent group B is mixed with the organic solvent of the solvent group A.

Here, combination of the organic solvent of the solvent group A and the organic solvent of the solvent group B, that is, the mixed solvent is preferably one selected from mixed solvents MS1 to MS12, from the viewpoint of prevention of whitening on the surface of the polyimide molded article, improvement of preservation stability, improvement of film forming characteristics, and the like. The mixed solvent is more preferably one selected from the following mixed solvents MS1, MS3, MS4, MS6, MS7, MS9, MS10, and MS12.

MS1: mixed solvent containing 1,3-dimethyl-2-imidazolidinone and cyclohexanone

MS2: mixed solvent containing 1,3-dimethyl-2-imidazolidinone and cyclopentanone

MS3: mixed solvent containing 1,3-dimethyl-2-imidazolidinone and isophorone

MS4: mixed solvent containing 3-methoxy-N,N-dimethylpropanamide and cyclohexanone MS5: mixed solvent containing 3-methoxy-N,N-dimethylpropanamide and cyclopentanone MS6: mixed solvent containing 3-methoxy-N,N-dimethylpropanamide and isophorone MS7: mixed solvent containing 3-methoxy-N,N-dibutyl-propanamide and cyclohexanone MS8: mixed solvent containing 3-methoxy-N,N-dibutyl-propanamide and cyclopentanone MS9: mixed solvent containing 3-methoxy-N,N-dibutyl-propanamide and isophorone MS10: mixed solvent containing γ-butyrolactone and cyclohexanone MS11: mixed solvent containing γ-butyrolactone and cyclopentanone MS12: mixed solvent containing γ-butyrolactone and isophorone In the mixed solvent, the boiling point of the organic solvent of the solvent group A (boiling point of the organic solvent A) may be higher than the boiling point of the organic solvent of the solvent group B (boiling point of the organic solvent B). For example, when a base is coated with the polyimide precursor composition, and then a heat treatment is performed, and thereby the polyimide molded article is obtained, the organic solvent of the solvent group B having a low boiling point is evaporated (at a low temperature), prior to the organic solvent of the solvent group A. Since the organic solvent of the solvent group A which is a good solvent for the polyimide precursor remains even after the organic solvent of the solvent group B is evaporated, precipitation of the polyimide precursor is difficult. Thus, whitening on the surface of the polyimide molded article is easily prevented. In addition, preservation stability and film forming characteristics are easily improved.

There is a film defect such as a void (trace obtained by causing the solvent to burst through the coated film and volatilizing the solvent) occurring when the organic solvent of the solvent group B is volatilized. The film defect is restored by causing the remaining organic solvent of the solvent group A to dissolve the polyimide precursor, and thus molding of a polyimide molded article having good quality is performed.

If a mixed solvent obtained by substituting a portion of the organic solvent of the solvent group A with the organic solvent of the solvent group B having a low boiling point is used, molding of a polyimide molded article is performed with energy smaller than energy used in a case where the organic solvent of the solvent group A which is the good solvent is singly used.

From the viewpoint of prevention of whitening on the surface of the polyimide molded article, improvement of preservation stability, improvement of film forming characteristics, and the like, the boiling point of the organic solvent of the solvent group A is preferably from 150° C. to 300° C., and more preferably from 200° C. to 250° C.

From the viewpoint of prevention of whitening on the surface of the polyimide molded article, improvement of preservation stability, improvement of film forming characteristics, and the like, the boiling point of the organic solvent of the solvent group B is preferably from 80° C. to 250° C., and more preferably from 100° C. to 200° C.

In the mixed solvent, a ratio (total amount of the organic solvent of the solvent group A:total amount of the organic solvent of the solvent group B) of the total amount of the organic solvent of the solvent group A and the total amount of the organic solvent of the solvent group B is preferably in a range of 9:1 to 2:8 in weight ratio, more preferably in a range of 9:1 to 3:7, and further preferably in a range of 9:1 to 5:5, from the viewpoint of prevention of whitening on the surface of the polyimide molded article, improvement of preservation stability, improvement of film forming characteristics, and the like.

Particularly, since the organic solvent of the solvent group A and the organic solvent of the solvent group B are used together, improved solubility of the polyimide precursor, prevention of whitening on the surface of the polyimide molded article, improvement of the preservation stability, and improvement of the film forming characteristics are easily obtained even in a wide range which is the above range of 9:1 to 2:8.

The mixed solvent may contain other solvents if necessary. However, the content of the other solvents may be equal to or less than 50% by weight (preferably equal to or less than 30% by weight) for the entirety of the mixed solvent.

An example of the other solvents includes known solvents. An example of the known solvents includes an ethylene glycol ether solvent such as ethyl cellosolve, propyl cellosolve, and butyl cellosolve; a propylene glycol ether solvent; an alcohol solvent such as propanol, butanol, ethylene glycol, and propylene glycol; water and the like.

The content of the mixed solvent is preferably from 70% by weight to 99% by weight for the polyimide precursor composition, more preferably from 80% by weight to 95% by weight, and further preferably from 80% by weight to 90% by weight.

Other Additives

The polyimide precursor composition according to this exemplary embodiment has a purpose for applying various functions such as conductivity and mechanical strength to a polyimide molded article prepared by using the polyimide precursor composition. Thus, the polyimide precursor composition may contain various fillers and the like. That is, the polyimide precursor composition may contain a catalyst for accelerating the imidization reaction, a leveling material for improving quality of a prepared film, or the like.

An example of a conductive material added for applying conductivity includes a conductive material (for example, volume resistivity being less than $10^7$ Ω·cm, this is similar below) or a semiconductive material (for example, volume resistivity being from $10^7$ Ω·cm to $10^{13}$ Ω·cm, this is similar below). These conductive materials are selected in accordance with a use purpose.

An example of a conducting agent includes carbon black (for example, acidic carbon black being equal to or less than pH 5.0), metal (for example, aluminum, nickel, and the like), metal oxide (for example, yttrium oxide, tin oxide, and the like), an ion conductive material (for example, potassium titanate, LiCl, and the like), a conductive polymer (for example, polyaniline, polypyrrole, polysulfone, polyacetylene, and the like), and the like.

One type of the conductive material may be singly used or combination of two types may be used.

When the conductive material has a particle shape, the conductive material may be particles having a primary particle size being less than 10 μm, and preferably being equal to or less than 1 μm.

An example of the filler added for improving the mechanical strength includes a particle-shaped material such as silica powder, alumina powder, barium sulfate powder, titanium oxide powder, mica, and talc. Fluororesin powder such as polytetrafluoro ethylene (PTFE) and tetrafluoroethylene perfluoroalkyl vinyl ether copolymer (PFA), and the like may be added for improving water repellency and release properties on the surface of the polyimide molded article.

As the catalyst for accelerating the imidization reaction, a dehydrating agent such as acidic anhydride, and an acidic catalyst such as a phenol derivative, a sulfonic acid derivative, and a benzoic acid derivative may be used.

A surfactant may be added for improving quality of a prepared film using the polyimide molded article. The surfactant to be used may be cationic, anionic, or nonionic.

The content of the other additives may be selected in accordance with a use purpose of the prepared polyimide molded article.

Method of Preparing Polyimide Precursor Composition

The preparing method of the polyimide precursor composition according to this exemplary embodiment is not particularly limited. For example, the following method is included.

(A) A method of preparing a polyimide precursor composition in which tetracarboxylic dianhydride and a diamine compound is polycondensed in a mixed solvent, and thereby a polyimide precursor is obtained. The mixed solvent contains at least one organic solvent A (organic solvent of the solvent group A) selected from a solvent group consisting of an aprotic polar solvent containing nitrogen atoms, and a lactone solvent, and at least one organic solvent B (organic solvent of the solvent group B) selected from a solvent group consisting of a non-aqueous solvent having a carbonyl structure.

(B) A preparing method of a polyimide precursor composition in which tetracarboxylic dianhydride and a diamine compound is polycondensed in one or more types of organic solvent A (organic solvent of the solvent group A), and thereby a polyimide precursor is obtained, and then one or more types of organic solvent B (organic solvent of the solvent group B) is added to the organic solvent A. The organic solvent of the solvent group A is selected from a solvent group which is formed from an aprotic polar solvent containing nitrogen atoms and a lactone solvent. The organic solvent of the solvent group B is selected from a solvent group which is formed from a non-aqueous solvent having a carbonyl structure.

(C) A preparing method of a polyimide precursor composition in which tetracarboxylic dianhydride and a diamine compound is polymerized in a known solvent, and thereby a polyimide precursor is obtained, and then the known solvent is substituted with a mixed solvent of the organic solvent of the solvent group A and the organic solvent of the solvent group B (referred to as "solvent substitution" below).

Regarding the preparing method of the polyimide precursor composition according to this exemplary embodiment, the preparing methods (A) and (B) are preferably in that a polyimide precursor composition is easily obtained.

Here, the known solvent is not particularly limited as long as the known solvent is a solvent which causes a polyimide precursor to be obtained by polymerization. An example of the known solvent includes an aprotic polar solvent (for example, γ-butyrolactone, DMAc, NMP, and the like), a THF/methanol mixed solvent, and the like.

An example of the solvent substitution includes a method of performing solvent substitution after an original solvent is distilled by heating or decompressing, a method of performing solvent substitution after a solid of a polyimide precursor is extracted once by reprecipitation, and the like. In any method thereof, if necessary, a dry process may be also performed before the solvent substitution.

The reaction temperature during a polymerization reaction of the polyimide precursor may be, for example, from 0° C. to 70° C., preferably be from 10° C. to 60° C., and more preferably be from 20° C. to 55° C. The reaction temperature is set to be equal to or higher than 0° C., and thus progress of the polymerization reaction is accelerated, a period of time required for the reaction is reduced, and productivity is easily improved. If the reaction temperature is equal to or lower than 70° C., progress of the imidization reaction occurring in molecules of the prepared polyimide precursor is prevented, and precipitation or gelling occurring by deterioration of solubility of the polyimide precursor is easily prevented.

The period of time during the polymerization reaction of the polyimide precursor may be in a range from one hour to 24 hours, in accordance with the reaction temperature.

Usage Example of Polyimide Precursor Composition

The polyimide precursor composition according to this exemplary embodiment is used as a coating liquid for forming a polyimide molded article. An example of the coating liquid for forming a polyimide molded article includes a coating liquid for forming a polyimide film, a coating liquid for forming a polyimide coating film, and the like.

As the polyimide film used as the polyimide molded article, a flexible electronic board film, a copper-clad laminated film, a laminate film, an electrically-insulating film, a porous film for a fuel cell, a separation film, and the like are exemplified.

As the polyimide coating film used as the polyimide molded article, an insulation coating film, a thermal resistance coating film, an IC package, an adhesive film, a liquid crystal orientation film, a resist film, a planarization film, a microlens array film, an electric wire coating film, an optical fiber coating film, and the like are exemplified.

As other polyimide molded articles, a belt member is included. As the belt member, a driving belt, a belt (for example, an intermediate transfer belt, a transfer belt, a fixation belt, and a transporting belt) for an electrophotographic image forming apparatus, and the like are exemplified.

Method of Preparing Polyimide Molded Article

The preparing method of the polyimide molded article according to this exemplary embodiment is a method of obtaining a polyimide molded article by performing a heat treatment after a base is coated with the polyimide precursor composition according to this exemplary embodiment. The polyimide molded article prepared by using the polyimide precursor composition is not particularly limited.

As an example of the preparing method of the polyimide molded article according to this exemplary embodiment, a method of preparing an endless belt will be described below in detail.

For example, the preparing method of an endless belt includes a process of forming an coated film by applying the polyimide precursor composition onto a cylindrical base, a process of forming a dried film by drying the coated film formed on the base, a process of forming a polyimide resin layer by performing imidization treatment (heat treatment) on the dried film and imidizing the polyimide precursor, and a process of detaching the polyimide resin layer from the base and setting the detached polyimide resin layer as the endless belt. A specific example is as follows.

First, an inner surface or an outer surface of the cylindrical base is coated with the polyimide precursor composition, and thereby a coated film is formed. As the cylindrical base, for example, a cylindrical metallic base is appropriately used. Instead of the metallic base, a base formed of other materials such as resin, glass, and ceramic may be used. Glass coating, ceramic coating, and the like may be provided on the surface of the base. In addition, a silicone peeling agent, a fluorine peeling agent, and the like may be applied.

Here, a process of defoaming the polyimide precursor composition may be performed before coating, in order to apply the polyimide precursor composition with high accuracy. The polyimide precursor composition is defoamed and thus occurrence of foam and defects on the coated film during coating is prevented.

As a method of defoaming the polyimide precursor composition, a method of causing the polyimide precursor composition to be in a decompression state, a method of performing centrifugal separation and the like are included. However, the method of causing the polyimide precursor composition to be in a decompression state is appropriate because this method is simple and has large defoaming performance.

Then, the cylindrical base on which the coated film with the polyimide precursor composition is formed is placed under a heating or vacuum environment and the coated film is dried, and thereby a dried film is formed. The solvent being equal to or greater than 30% by weight of the contained solvent and preferably equal to or greater than 50% by weight is volatilized.

Then, the imidization treatment (heat treatment) is performed on the dried film, and thereby a polyimide resin layer is formed.

Heating conditions of the imidization treatment are a temperature of 150° C. to 400° C. (preferably 200° C. to 300° C.) and a period of time of 20 minutes to 60 minutes, for example. Heating under the above heating conditions causes the imidization reaction, and thereby the polyimide resin layer is formed. Before the temperature reaches the final temperature in heating process, heating may be performed at the temperature which is increased stepwise or is slowly increased at a constant speed, during a heating reaction. The temperature during imidization varies, for example, depending on the types of tetracarboxylic dianhydride and diamine which are used as the raw material. If the imidization is insufficiently performed, mechanical characteristics and electrical characteristics are deteriorated. Thus, the temperature during imidization is set to be a temperature causing the imidization to be completed.

Then, the polyimide resin layer is detached from the cylindrical base and thereby an endless belt is obtained.

When the polyimide molded article is used as an intermediate transfer belt, a value of surface resistivity of an outer circumferential surface is preferably from 8 (Log Ω/square) to 13 (Log Ω/square) in a manner of common logarithm, and is more preferably from 8 (Log Ω/square) to 12 (Log Ω/square). If the value of the surface resistivity in the common logarithm is greater than 13 (Log Ω/square), a recording medium and an intermediate transfer member may electrostatically adhere to each other during secondary transfer, and thus peeling of the recording medium may be different. If the value of the surface resistivity in the common logarithm is smaller than 8 (Log Ω/square), holding power of a toner image which has been primarily transferred to the intermediate transfer member may be insufficient and thus image quality may be granulated or an image may be in disorder.

The value of the surface resistivity in common logarithm is controlled by the type of the conductive material and the quantity of the added conductive material.

Polyimide Molded Article

The polyimide molded article formed of the polyimide precursor composition according to this exemplary embodiment contains an organic solvent and the like contained in the polyimide precursor composition according to this exemplary embodiment.

An aqueous solvent contained in the polyimide molded article is, for example, 1 ppb or more and less than 1% of the polyimide molded article. The quantity of the organic solvent contained in the polyimide molded article is determined in such a manner that a volume of a gas generated by heating the polyimide molded article is determined by using a gas chromatography method.

EXAMPLES

Hereinafter, examples will be described. However, the exemplary embodiment of the invention is not limited to these examples. In the following descriptions, all of "part" and "%" use weight as a reference as long as there is no particular mention.

Example 1

Preparation of Polyimide Precursor Composition (AA-1)

A flask equipped with a stirring bar, a thermometer and a dripping funnel is charged with 400 g of 1,3-dimethyl-2-imidazolidinone (DMI) and 400 g of cyclohexanone (CH) as solvents. 82.47 g (411.86 mmol) of diaminodiphenyl ether (ODA: molecular weight 200.24) is added thereto as the diamine compound. The added diaminodiphenyl ether is dissolved by stirring at 60° C. for 30 minutes. 117.53 g (399.46 mmol) of 3,3',4,4'-biphenyl tetracarboxylic dianhydride (BPDA: molecular weight 294.22) is added thereto as tetracarboxylic dianhydride. Dissolution and reaction is performed by performing stirring for 24 hours with maintaining the reaction temperature of 60° C., and thus, a polyimide precursor composition (AA-1) is obtained.

An imidization rate of the generated polyimide precursor is 0.03 and the quantity of the terminal amino groups of the polyimide precursor is measured as described above. As a result, there is a polyimide precursor having an amino group at a terminal at least.

Measurement is performed as follows.

Viscosity Measuring Method

Viscosity is measured under the following conditions by using an E type viscometer.

Measuring device: E type rotation viscometer TV-20H (Toki Sangyo Co., Ltd)

Measurement probe: No. 3 type rotor 3°×R14

Measurement temperature: 22° C.

Solid Content Measuring Method

A solid content is measured under the following conditions by using a differential heat-thermogravimetry simultaneous measurement device. The solid content is measured as a solid fraction of polyimide, with a measured value at 380° C.

Measuring device: differential heat-thermogravimetry simultaneous measurement device TG/DTA6200 (Seiko Instruments Inc.)

Measurement range: from 20° C. to 400° C.

Temperature rising speed: 20° C./minute

Rate of Gradual Change of Viscosity After 30 Days

A glass container is charged with the prepared polyimide precursor composition (vanish sample) and is air-tightly sealed. Viscosity thereof under an environment of 30° C. after 30 days is measured (viscosity after 30 days). An amount of a change in viscosity is calculated from initial viscosity by using the following expression, and the calculated amount of a change in viscosity is set as a rate of a gradual change of viscosity.

Rate of gradual change of viscosity (%)={(viscosity after 30 days)−(initial viscosity)}/(initial viscosity)×100

Molded Article Evaluation

A film is prepared using the obtained polyimide precursor composition (A-1) to thereby prepare a film having an endless belt shape. Film forming characteristics of the prepared film is evaluated.

Film Preparing Test

An outer surface of a stainless steel cylindrical mold (cylindrical base) being 90 mm in outer diameter and 450 mm in length is coated with a silicone releasing agent (manufactured by Shin-Etsu Chemical Co., Ltd., product name: KS-700) and then dried to perform a releasing-agent treatment. While the cylindrical mold subjected to the releasing-agent treatment is rotated at a speed of 10 rpm in a circumferential direction, a polyimide precursor composition A1 as a coating liquid is discharged from a dispenser having a caliber of 1.0 mm at an end portion of the cylindrical mold, and coating with the discharged polyimide precursor composition A1 is performed under a uniform pressing with a metal blade installed on the mold. Specifically, the dispenser unit is moved at a speed of 100 mm/minute in an axial direction of the cylindrical mold, and thus the cylindrical mold is spirally coated with the coating liquid. After coating, the blade is disjoined, and then leveling is performed by continuously rotating the cylindrical mold for two minutes.

Then, the mold and the coated material are subjected to the dry treatment for 30 minutes being rotated at 10 rpm under an air atmosphere of 120° C. in a dry furnace. The solvent is volatilized from the coated material in the dry treatment, and thus a molded article (endless belt body) of the polyimide precursor having self-supporting characteristics is obtained from the coated material.

Then, a heat treatment (baking treatment) is performed at 300° C. in a clean oven for 30 minutes and thus the solvent is distilled and the imidization reaction is completed.

Then, the cylindrical mold is set to be at 25° C., and the molded article is detached from the cylindrical mold, and thereby a cylindrical polyimide molded article is obtained.

Film Forming Characteristics

Regarding a film obtained after the polyimide precursor composition is applied, a film obtained after dry, and the finally-obtained cylindrical polyimide molded article, film forming properties are visually evaluated from the following viewpoints.

(1) Dropping

It is evaluated whether or not the polyimide composition is dropped onto a mold surface.

A: Dropping of the coated material is not viewed.

B: Dropping is confirmed at an end portion of the coated material.

C: Dropping is confirmed at the end portion and the center portion of the coated material.

D: Dropping is confirmed in the entirety of the coated material.

(2) Coating Cissing (Aggregation)

It is evaluated whether or not the polyimide composition after coating has cissing (aggregation) on the mold surface.

A: Cissing (aggregation) is not viewed on the coating surface.

B: Cissing (aggregation) is confirmed at a portion having an area less than 10% of the area of the coating surface.

C: Cissing (aggregation) is confirmed at a portion having an area which is 10% or more and less than 50% of the area of the coating surface.

D: Cissing (aggregation) is confirmed at a portion having an area which is equal to or greater than 50% of the area of the coating surface.

(3) Dry Cissing

It is evaluated whether or not the polyimide composition after dry has cissing (aggregation) on the mold surface.

A: Cissing (aggregation) is not viewed on the coating surface.

B: Cissing (aggregation) is confirmed at a portion having an area less than 10% of the area of the coating surface.

C: Cissing (aggregation) is confirmed at a portion having an area which is 10% or more and less than 50% of the area of the coating surface.

D: Cissing (aggregation) is confirmed at a portion having an area which is equal to or greater than 50% of the area of the coating surface.

(4) Void Trace

It is evaluated whether or not the cylindrical polyimide molded article after baking has a void trace on a surface thereof.

A: Formation of void trace is not viewed.

B: Void traces of one piece or more and less than 10 pieces are confirmed on the surface of the molded article.

C: There are void traces of 10 pieces or more and less than 50 pieces on the surface of the molded article.

D: Many void traces have been formed on the surface of the molded article.

(5) Surface Unevenness and Pattern

It is evaluated whether or not the cylindrical molded article after baking has surface unevenness and a pattern on a surface thereof.

A: Formation of surface unevenness and the pattern is not viewed.

B: The surface unevenness and the pattern are slightly confirmed on a portion of the surface of the molded article (portion having an area less than 10% of a surface area of the molded article).

C: The surface unevenness and the pattern are confirmed on a portion of the surface of the molded article (portion having an area which is equal to or greater than 10% of a surface area of the molded article).

D: The surface unevenness and the patterns have been uniformly formed on the surface of the molded article.

Whitening on Surface of Coated Material

The surface (surface on which the polyimide precursor composition comes into contact with the air) of the cylindrical polyimide molded article is evaluated based on the following criteria.

A: Impurities and whitening is not viewed on the surface

B: Impurities are viewed on a portion of the surface, but whitening is not viewed.

C: Whitening is viewed on a portion of the surface

D: Whitening is viewed on the entirety of the surface.

Examples 2 to 70

Preparation of Polyimide Precursor Composition (AA-2) and the like

A polyimide precursor composition (AA-2) and the like are prepared similarly to Example 1 except that synthesis conditions of the polyimide precursor composition are changed to conditions described in Tables 1 to 8.

Comparative Examples 1 to 14

And the Like

Preparation of Polyimide Precursor Compositions (R0-1) to (R0-10)

Polyimide precursor compositions (R0-1) to (R0-10) and the like are prepared similarly to Example 1 except that synthesis conditions of the polyimide precursor composition are changed to conditions described in Tables 9 to 10.

The details of the examples and the comparative examples, and evaluation results are shown in Tables 1 to 10.

In Tables 1 to 10, "uniform solution" in "composition properties" indicates that the polyimide precursor is dissolved in a state where polyimide precursor molecules are substantially uniform in the organic solvent. "Insolubleness" indicates that the polyimide precursor is present in a state of being precipitated in the solvent.

TABLE 1

| | | Examples·Comparative Examples | | | | | | | | |
|---|---|---|---|---|---|---|---|---|---|---|
| | | Example 1 | Example 2 | Example 3 | Example 4 | Example 5 | Example 6 | Example 7 | Example 8 | Example 9 |
| Polyimide precursor composition | | AA-1 | AA-2 | AA-3 | AB-1 | AB-2 | AB-3 | AC-1 | AC-2 | AC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| Equivalent ratio | | 0.97 | 0.97 | 0.97 | 0.98 | 0.98 | 0.98 | 0.985 | 0.985 | 0.985 |
| Organic solvent of solvent group A | Solvent type | DMI | DMI | DMI | DMI | DMI | DMI | DMI | DMI | DMI |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor (×10$^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | A | A | A | A | A | A |
| | Coating cissing (aggregation) | A | A | A | A | A | A | A | A | A |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | A | A | A | A | A | A | A | A | A |

TABLE 2

| | | Examples·Comparative Examples | | | | | | | | |
|---|---|---|---|---|---|---|---|---|---|---|
| | | Example 10 | Example 11 | Example 12 | Example 13 | Example 14 | Example 15 | Example 16 | Example 17 | Example 18 |
| Polyimide precursor composition | | BA-1 | BA-2 | BA-3 | BB-1 | BB-2 | BB-3 | BC-1 | BC-2 | BC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| Equivalent ratio | | 0.97 | 0.97 | 0.97 | 0.98 | 0.98 | 0.98 | 0.985 | 0.985 | 0.985 |
| Organic solvent of solvent group A | Solvent type | MDMPA | MDMPA | MDMPA | MDMPA | MDMPA | MDMPA | MDMPA | MDMPA | MDMPA |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |

TABLE 2-continued

| | | Example 10 | Example 11 | Example 12 | Example 13 | Example 14 | Example 15 | Example 16 | Example 17 | Example 18 |
|---|---|---|---|---|---|---|---|---|---|---|
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor ($\times 10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | A | A | A | A | A | A |
| | Coating cissing (aggregation) | A | A | A | A | A | A | A | A | A |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | A | A | A | A | A | A | A | A | A |

TABLE 3

| | | Example 19 | Example 20 | Example 21 | Example 22 | Example 23 | Example 24 | Example 25 | Example 26 | Example 27 |
|---|---|---|---|---|---|---|---|---|---|---|
| Polyimide precursor composition | | CA-1 | CA-2 | CA-3 | CB-1 | CB-2 | CB-3 | CC-1 | CC-2 | CC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| Equivalent ratio | | 0.97 | 0.97 | 0.97 | 0.98 | 0.98 | 0.98 | 0.985 | 0.985 | 0.985 |
| Organic solvent of solvent group A | Solvent type | MDBPA | MDBPA | MDBPA | MDBPA | MDBPA | MDBPA | MDBPA | MDBPA | MDBPA |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor ($\times 10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | A | A | A | A | A | A |
| | Coating cissing (aggregation) | A | A | A | A | A | A | A | A | A |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | A | A | A | A | A | A | A | A | A |

TABLE 4

| | | Example 28 | Example 29 | Example 30 | Example 31 | Example 32 | Example 33 | Example 34 | Example 35 | Example 36 |
|---|---|---|---|---|---|---|---|---|---|---|
| Polyimide precursor composition | | DA-1 | DA-2 | DA-3 | DB-1 | DB-2 | DB-3 | DC-1 | DC-2 | DC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |

TABLE 4-continued

| | | Example 28 | Example 29 | Example 30 | Example 31 | Example 32 | Example 33 | Example 34 | Example 35 | Example 36 |
|---|---|---|---|---|---|---|---|---|---|---|
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| | Equivalent ratio | 0.97 | 0.97 | 0.97 | 0.98 | 0.98 | 0.98 | 0.985 | 0.985 | 0.985 |
| Organic solvent of solvent group A | Solvent type | NMP | NMP | NMP | NMP | NMP | NMP | NMP | NMP | NMP |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor ($\times 10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | B | B | B | A | A | A |
| | Coating cissing (aggregation) | B | B | B | B | B | B | B | B | B |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | B | B | B | B | B | B | B | B | B |

TABLE 5

| | | Example 37 | Example 38 | Example 39 | Example 40 | Example 41 | Example 42 | Example 43 | Example 44 | Example 45 |
|---|---|---|---|---|---|---|---|---|---|---|
| Polyimide precursor composition | | EA-1 | EA-2 | EA-3 | EB-1 | EB-2 | EB-3 | EC-1 | EC-2 | EC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| | Equivalent ratio | 0.97 | 0.97 | 0.97 | 0.98 | 0.98 | 0.98 | 0.985 | 0.985 | 0.985 |
| Organic solvent of solvent group A | Solvent type | NEP | NEP | NEP | NEP | NEP | NEP | NEP | NEP | NEP |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor ($\times 10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | A | A | A | A | A | A |
| | Coating cissing (aggregation) | A | A | A | A | A | A | A | A | A |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | B | B | B | B | B | B | B | B | B |

TABLE 6

| | | Example 46 | Example 47 | Example 48 | Example 49 | Example 50 | Example 51 | Example 52 | Example 53 | Example 54 |
|---|---|---|---|---|---|---|---|---|---|---|
| Polyimide precursor composition | | FA-1 | FA-2 | FA-3 | FB-1 | FB-2 | FB-3 | FC-1 | FC-2 | FC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| Equivalent ratio | | 0.97 | 0.97 | 0.97 | 0.98 | 0.98 | 0.98 | 0.985 | 0.985 | 0.985 |
| Organic solvent of solvent group A | Solvent type | δ-VL | δ-VL | δ-VL | δ-VL | δ-VL | δ-VL | δ-VL | δ-VL | δ-VL |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor (×$10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | A | A | A | A | A | A |
| | Coating cissing (aggregation) | A | A | A | A | A | A | A | A | A |
| | Dry cissing | A | A | A | A | A | A | A | A | A |
| | Void trace | A | A | A | A | A | A | A | A | A |
| | Surface unevenness and pattern | A | A | A | A | A | A | A | A | A |
| Whitening on surface of molded article | | A | A | A | B | B | B | A | A | A |

TABLE 7

| | | Example 55 | Example 56 | Example 57 | Example 58 | Example 59 | Example 60 | Example 61 | Example 62 | Example 63 |
|---|---|---|---|---|---|---|---|---|---|---|
| Polyimide precursor composition | | GA-1 | GA-2 | GA-3 | GB-1 | GB-2 | GB-3 | GC-1 | GC-2 | GC-3 |
| Tetracarboxylic dianhydride | Chemical type | BPDA | BPDA | BPDA | BPDA | BPDA | BPDA | BPDA | BPDA | BPDA |
| | Mixing (g) | 117.53 | 117.53 | 117.53 | 118.03 | 118.03 | 118.03 | 118.28 | 118.28 | 118.28 |
| | quantity (mmol) | 399.46 | 399.46 | 399.46 | 401.16 | 401.16 | 401.16 | 402.01 | 402.01 | 402.01 |
| Diamine compound | Chemical type | ODA | ODA | ODA | ODA | ODA | ODA | ODA | ODA | ODA |
| | Mixing (g) | 82.47 | 82.47 | 82.47 | 81.97 | 81.97 | 81.97 | 81.72 | 81.72 | 81.72 |
| | quantity (mmol) | 411.86 | 411.86 | 411.86 | 409.36 | 409.36 | 409.36 | 408.11 | 408.11 | 408.11 |
| Equivalent ratio | | 0.97 | 0.97 | 0.97 | 0.98 | 0.98 | 0.98 | 0.985 | 0.985 | 0.985 |
| Organic solvent of solvent group A | Solvent type | γ-BL | γ-BL | γ-BL | γ-BL | γ-BL | γ-BL | γ-BL | γ-BL | γ-BL |
| | Mixing quantity (g) | 400 | 720 | 160 | 400 | 720 | 160 | 400 | 720 | 160 |
| Organic solvent of solvent group B | Solvent type | CH | CH | CH | IP | IP | IP | CP | CP | CP |
| | Mixing quantity (g) | 400 | 80 | 640 | 400 | 80 | 640 | 400 | 80 | 640 |
| Concentration of polyimide precursor (%) | | 20 | 20 | 20 | 20 | 20 | 20 | 20 | 20 | 20 |
| Solvent group A/solvent group B (weight ratio) | | 5/5 | 9/1 | 2/8 | 5/5 | 9/1 | 2/8 | 5/5 | 9/1 | 2/8 |
| Composition properties | | Uniform solution | Uniform solution | Uniform solution | Uniform solution | Uniform solution | Uniform solution | Uniform solution | Uniform solution | Uniform solution |
| Viscosity of composition (Pas) | | 6 | 5 | 8 | 60 | 50 | 80 | 6 | 5 | 8 |
| Viscosity of composition after 30 days at room temperature (Pas) | | 6 | 5 | 8 | 60 | 50 | 80 | 6 | 5 | 8 |
| Rate of gradual change of viscosity (%) | | 0.00 | 0.00 | 0.00 | 0.00 | 0.00 | 0.00 | 0.00 | 0.00 | 0.00 |
| Number average molecular weight of polyimide precursor (×$10^3$) | | 30 | 30 | 30 | 50 | 50 | 50 | 70 | 70 | 70 |
| Imidization rate of polyimide precursor (%) | | 0.03 | 0.03 | 0.04 | 0.03 | 0.03 | 0.04 | 0.03 | 0.03 | 0.04 |
| Film forming characteristics (coating properties) | Dropping | A | A | A | B | B | B | A | A | A |
| | Coating cissing (aggregation) | A | A | A | B | B | B | A | A | A |
| | Dry cissing | A | A | A | A | A | A | A | A | A |

TABLE 7-continued

| | Example 55 | Example 56 | Example 57 | Example 58 | Example 59 | Example 60 | Example 61 | Example 62 | Example 63 |
|---|---|---|---|---|---|---|---|---|---|
| Void trace | A | A | A | A | A | A | A | A | A |
| Surface unevenness and pattern | A | A | A | A | A | A | A | A | A |
| Whitening on surface of molded article | A | A | A | A | A | A | A | A | A |

TABLE 8

| | | Example 64 | Example 65 | Example 66 | Example 67 | Example 68 | Example 69 | Example 70 |
|---|---|---|---|---|---|---|---|---|
| Polyimide precursor composition | | AA-4 | AA-5 | AA-6 | AA-7 | AA-8 | AA-9 | AA-10 |
| Tetracarboxylic dianhydride | Chemical type | BPDA | PMDA | BPDA | BPDA | BPDA | BPDA | BPDA |
| | Mixing (g) | 145.04 | 82.20 | 113.88 | 116.52 | 118.52 | 119.01 | 120.43 |
| | quantity (mmol) | 492.96 | 376.86 | 387.07 | 396.04 | 402.84 | 404.48 | 409.32 |
| Diamine compound | Chemical type | PDA | ODA | ODA | ODA | ODA | ODA | ODA |
| | Mixing (g) | 54.96 | 77.80 | 86.22 | 83.48 | 81.48 | 80.99 | 79.57 |
| | quantity (mmol) | 508.23 | 388.53 | 430.59 | 416.88 | 406.9 | 404.48 | 397.39 |
| Equivalent ratio | | 0.97 | 0.97 | 0.9 | 0.95 | 0.99 | 1 | 1.03 |
| Organic solvent of solvent group A | Solvent type | DMI | DMI | DMI | DMI | DMI | DMI | DMI |
| | Mixing quantity (g) | 400 | 420 | 400 | 400 | 400 | 400 | 400 |
| Organic solvent of solvent group B | Solvent type | CH | CH | CH | CH | CH | CH | CH |
| | Mixing quantity (g) | 400 | 420 | 400 | 400 | 400 | 400 | 400 |
| Concentration of polyimide precursor (%) | | 20 | 16 | 20 | 20 | 20 | 20 | 20 |
| Solvent group A/solvent group B (weight ratio) | | 5/5 | 5/5 | 5/5 | 5/5 | 5/5 | 5/5 | 5/5 |
| Composition properties | | Uniform solution | Uniform solution | Uniform solution | Uniform solution | Uniform solution | Uniform solution | Uniform solution |
| Viscosity of composition (Pas) | | 9 | 3 | 0.5 | 3 | 180 | 200 | 7 |
| Viscosity of composition after 30 days at room temperature (Pas) | | 9 | 3 | 0.5 | 3 | 190 | 220 | 4 |
| Rate of gradual change of viscosity (%) | | 0.00 | 0.00 | 0.00 | 0.00 | 5.56 | 10.00 | −42.86 |
| Number average molecular weight of polyimide precursor ($\times 10^3$) | | 32 | 20 | 3 | 10 | 50 | 100 | 30 |
| Imidization rate of polyimide precursor (%) | | 0.03 | 0.03 | 0.03 | 0.03 | 0.03 | 0.03 | 0.03 |
| Film forming characteristics (coating properties) | Dropping | A | A | A | A | A | A | A |
| | Coating cissing (aggregation) | A | A | A | A | A | A | A |
| | Dry cissing | A | A | A | A | A | A | A |
| | Void trace | A | A | A | A | A | A | A |
| | Surface unevenness and pattern | A | A | A | A | A | A | A |
| Whitening on surface of molded article | | A | A | A | A | A | A | A |

TABLE 9

| | | Comparative example 1 | Comparative example 2 | Comparative example 3 | Comparative example 4 | Comparative example 5 | Comparative example 6 |
|---|---|---|---|---|---|---|---|
| Polyimide precursor composition | | R0-1 | R0-2 | R0-3 | R0-4 | R0-5 | R0-6 |
| Tetracarboxylic dianhydride | Chemical type | BPDA | BPDA | BPDA | BPDA | BPDA | BPDA |
| | Mixing (g) | 117.53 | 117.53 | 117.53 | 117.53 | 117.53 | 117.53 |
| | quantity (mmol) | 399.46 | 399.46 | 399.46 | 399.46 | 399.46 | 399.46 |
| Diamine compound | Chemical type | ODA | ODA | ODA | ODA | ODA | ODA |
| | Mixing (g) | 82.47 | 82.47 | 82.47 | 82.47 | 82.47 | 82.47 |
| | quantity (mmol) | 411.86 | 411.86 | 411.86 | 411.86 | 411.86 | 411.86 |
| Equivalent ratio | | 0.97 | 0.97 | 0.97 | 0.97 | 0.97 | 0.97 |
| Organic solvent of solvent group A | Solvent type | NMP | DMI | NEP | MDMPA | MDBPA | δ-VL |
| | Mixing quantity (g) | 800 | 800 | 800 | 800 | 800 | 800 |
| Organic solvent of solvent group B | Solvent type | — | — | — | — | — | — |
| | Mixing quantity (g) | — | — | — | — | — | — |
| Concentration of polyimide precursor (%) | | 20 | 20 | 20 | 20 | 20 | 20 |
| Solvent group A/solvent group B (weight ratio) | | Single | Single | Single | Single | Single | Single |
| Composition properties | | Uniform solution | Uniform solution | Uniform solution | Uniform solution | Uniform solution | Uniform solution |
| Viscosity of composition (Pas) | | 7 | 8 | 7 | 7 | 8 | 7 |
| Viscosity of composition after 30 days at room temperature (Pas) | | 6 | 5 | 4 | 2 | 2 | 4 |

TABLE 9-continued

|  |  |  |  |  |  |  |
|---|---|---|---|---|---|---|
| Rate of gradual change of viscosity (%) | −14.29 | −37.50 | −42.86 | −71.43 | −75.00 | −42.86 |
| Number average molecular weight of polyimide precursor (×$10^3$) | 50,000 | 50,000 | 50,000 | 50,000 | 50,000 | 50,000 |
| Imidization rate of polyimide precursor (%) | 0.05 | 0.05 | 0.05 | 0.05 | 0.05 | 0.05 |
| Film forming characteristics (coating properties) Dropping | B | B | B | B | B | B |
| Coating cissing (aggregation) | A | A | A | A | A | A |
| Dry cissing | A | A | A | A | B | B |
| Void trace | B | B | B | A | A | A |
| Surface unevenness and pattern | B | B | B | B | B | B |
| Whitening on surface of molded article | C | C | C | C | C | C |

| | | Examples•Comparative Examples | | | |
|---|---|---|---|---|---|
| | | Comparative example 7 | Comparative example 8 | Comparative example 9 | Comparative example 10 |
| Polyimide precursor composition | | R0-7 | R0-8 | R0-9 | R0-10 |
| Tetracarboxylic dianhydride | Chemical type | BPDA | BPDA | BPDA | BPDA |
| | Mixing (g) | 117.53 | 117.53 | 117.53 | 117.53 |
| | quantity (mmol) | 399.46 | 399.46 | 399.46 | 399.46 |
| Diamine compound | Chemical type | ODA | ODA | ODA | ODA |
| | Mixing (g) | 82.47 | 82.47 | 82.47 | 82.47 |
| | quantity (mmol) | 411.86 | 411.86 | 411.86 | 411.86 |
| Equivalent ratio | | 0.97 | 0.97 | 0.97 | 0.97 |
| Organic solvent of solvent group A | Solvent type | γ-BL | CH | IP | CP |
| | Mixing quantity (g) | 800 | 800 | 800 | 800 |
| Organic solvent of solvent group B | Solvent type | — | — | — | — |
| | Mixing quantity (g) | — | — | — | — |
| Concentration of polyimide precursor (%) | | 20 | 20 | 20 | 20 |
| Solvent group A/solvent group B (weight ratio) | | Single | Single | Single | Single |
| Composition properties | | Uniform solution | Insolubleness | Insolubleness | Insolubleness |
| Viscosity of composition (Pas) | | 7 | — | — | — |
| Viscosity of composition after 30 days at room temperature (Pas) | | 4 | — | — | — |
| Rate of gradual change of viscosity (%) | | −42.86 | — | — | — |
| Number average molecular weight of polyimide precursor (×$10^3$) | | 50,000 | — | — | — |
| Imidization rate of polyimide precursor (%) | | 0.05 | — | — | — |
| Film forming characteristics (coating properties) | Dropping | B | — | — | — |
| | Coating cissing (aggregation) | A | — | — | — |
| | Dry cissing | B | — | — | — |
| | Void trace | A | — | — | — |
| | Surface unevenness and pattern | B | — | — | — |
| Whitening on surface of molded article | | C | — | — | — |

TABLE 10

| | | Examples•Comparative Examples | | | |
|---|---|---|---|---|---|
| | | Comparative example 11 | Comparative example 12 | Comparative example 13 | Comparative example 14 |
| Polyimide precursor composition | | R1-1 | R1-2 | R1-3 | R1-4 |
| Tetracarboxylic dianhydride | Chemical type | BPDA | BPDA | BPDA | BPDA |
| | Mixing (g) | 117.53 | 117.53 | 117.53 | 117.53 |
| | quantity (mmol) | 399.46 | 399.46 | 399.46 | 399.46 |
| Diamine compound | Chemical type | ODA | ODA | ODA | ODA |
| | Mixing (g) | 82.47 | 82.47 | 82.47 | 82.47 |
| | quantity (mmol) | 411.86 | 411.86 | 411.86 | 411.86 |
| Equivalent ratio | | 0.97 | 0.97 | 0.97 | 0.97 |
| Organic solvent of solvent group A | Solvent type | NMP | NMP | NMP | NMP |
| | Mixing quantity (g) | 400 | 720 | 160 | 560 |
| Organic solvent of solvent group B | Solvent type | BC | BC | BC | BC |
| | Mixing quantity (g) | 400 | 80 | 640 | 240 |
| Concentration of polyimide precursor (%) | | 20 | 20 | 20 | 20 |
| Solvent group A/solvent group B (weight ratio) | | 5/5 | 9/1 | 2/8 | 7/3 |
| Composition properties | | Uniform solution | Uniform solution | cloudiness | Uniform solution |
| Viscosity of composition (Pas) | | 7 | 7 | — | 7 |
| Viscosity of composition after 30 days at room temperature (Pas) | | 0.8 | 0.5 | — | 0.5 |
| Rate of gradual change of viscosity (%) | | −88.57 | −92.86 | — | −92.86 |

TABLE 10-continued

| | | Examples•Comparative Examples | | | |
|---|---|---|---|---|---|
| | | Comparative example 11 | Comparative example 12 | Comparative example 13 | Comparative example 14 |
| Number average molecular weight of polyimide precursor (×10³) | | 50,000 | 50,000 | — | 50,000 |
| Imidization rate of polyimide precursor (%) | | 0.05 | 0.05 | — | 0.05 |
| Film forming characteristics (coating properties) | Dropping | C | C | — | C |
| | Coating cissing (aggregation) | C | C | — | C |
| | Dry cissing | C | C | — | C |
| | Void trace | C | C | — | C |
| | Surface unevenness and pattern | A | A | — | A |
| Whitening on surface of molded article | | D | D | — | D |

From the results, it is found that whitening on the surface of the polyimide molded article in these examples is prevented in comparison to the comparative examples. It is found that the rate of a gradual change of viscosity of the polyimide precursor composition is low and preservation stability is high in these examples. In addition, it is found that evaluations of the dropping, the coating cissing, the dry cis sing, the void trace, and the surface unevenness and pattern are good and the film forming characteristics (coating properties) are high in these examples.

Details of abbreviations and the like in Tables 1 to 10 will be described below.

"Imidization rate": value of "(2n+m)/(2l+2m+2n)" of formulas (I-1) to (I-3)

"Equivalent": molar ratio of the molar quantity of tetracarboxylic dianhydride and the molar quantity of the diamine compound (molar quantity of tetracarboxylic dianhydride/molar quantity of the diamine compound)

Tetracarboxylic Dianhydride
BPDA: 3,3',4,4'-biphenyl tetracarboxylic dianhydride
PMDA: pyromellitic dianhydride
Diamine Compound
ODA: 4,4'-diaminodiphenyl ether
PDA: p-phenylenediamine
Organic Solvent of Solvent Group A
NMP: N-methyl-2-pyrrolidone, boiling point 202° C.
NEP: N-ethyl-2-pyrrolidone, boiling point 218° C.
DMI: 1,3-dimethyl-2-imidazolidinone, boiling point 220° C.
MDMPA: 3-methoxy-N,N-dimethylpropanamide, boiling point 215° C.
MDBPA: 3-methoxy-N,N-dibutylpropanamide, boiling point 252° C.
γ-BL: γ-butyrolactone:boiling point 202° C.
δ-VL: δ-valerolactone:boiling point 230° C.
Organic Solvent of Solvent Group B
CH: cyclohexanone:boiling point 154° C.
CP: cyclopentanone:boiling point 130° C. to 131° C.
IP: isophorone:boiling point 215° C.
Other Organic Solvents
BC: butyl cellosolve The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition, comprising:
a mixed solvent and a polyimide precursor dissolved in the mixed solvent, the mixed solvent containing at least one organic solvent A and at least one organic solvent B,
wherein:
the organic solvent A is selected from the group consisting of an aprotic polar solvent which contains a nitrogen atom and a lactone solvent, and the organic solvent B is a non-aqueous solvent which has a carbonyl structure,
a ratio of the total amount of the organic solvent A and the total amount of the organic solvent B (total amount of the organic solvent A: total amount of the organic solvent B) is in a range of 9:1 to 2:8 in weight ratio, and
the polyimide precursor includes a resin having a constituent unit represented by the following Formula (I-1), Formula (I-2), and Formula (I-3):

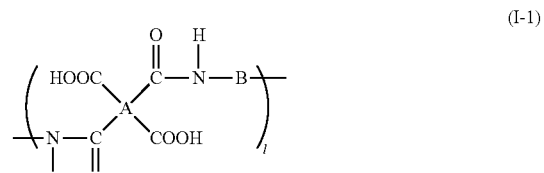

(I-1)

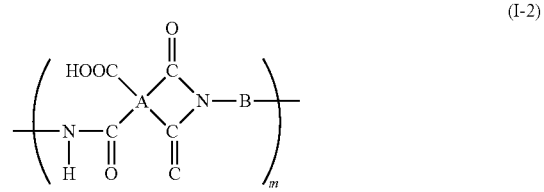

(I-2)

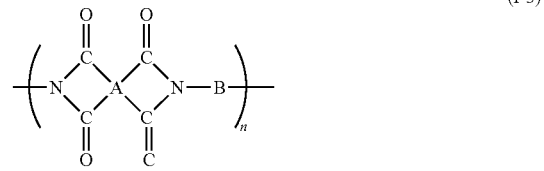

(I-3)

in which A indicates a tetravalent organic group; B indicates a bivalent organic group; and 1, m, and n respectively indicate integers of 0 or more and satisfy the following relationship:

$$(2n+m)/(2l+2m+2n) \le 0.2.$$

2. The polyimide precursor composition according to claim 1, wherein a boiling point of the organic solvent A is higher than a boiling point of the organic solvent B.

3. The polyimide precursor composition according to claim 1, wherein a boiling point of the organic solvent A is from 150° C. to 300° C.

4. The polyimide precursor composition according to claim 1, wherein a boiling point of the organic solvent B is from 80° C. to 250° C.

5. The polyimide precursor composition according to claim 1, wherein the organic solvent A is at least one organic solvent selected from the group consisting of 1,3-dimethyl-2-imidazolidinone, 3-methoxy-N,N-dimethylpropanamide, 3-methoxy-N,N-dibutylpropanamide, γ-butyrolactone, γ-valerolactone, δ-valerolactone, and ε-caprolactone.

6. The polyimide precursor composition according to claim 2, wherein the organic solvent A is at least one organic solvent selected from the group consisting of 1,3-dimethyl-2-imidazolidinone, 3-methoxy-N,N-dimethylpropanamide, 3-methoxy-N,N-dibutylpropanamide, γ-butyrolactone, γ-valerolactone, δ-valerolactone, and ε-caprolactone.

7. The polyimide precursor composition according to claim 1, wherein the organic solvent B is at least one organic solvent selected from the group consisting of a cyclic ketone solvent and a cyclic carbonate solvent.

8. The polyimide precursor composition according to claim 2, wherein the organic solvent B is at least one organic solvent selected from the group consisting of a cyclic ketone solvent and a cyclic carbonate solvent.

9. The polyimide precursor composition according to claim 3, wherein the organic solvent B is at least one organic solvent selected from the group consisting of a cyclic ketone solvent and a cyclic carbonate solvent.

10. The polyimide precursor composition according to claim 1, wherein the organic solvent B is at least one organic solvent selected from the group consisting of cyclohexanone, cyclopentanone, and isophorone.

11. The polyimide precursor composition according to claim 2, wherein the organic solvent B is at least one organic solvent selected from the group consisting of cyclohexanone, cyclopentanone, and isophorone.

12. The polyimide precursor composition according to claim 1, wherein the mixed solvent is one selected from the following mixed solvents MS1 to MS12,
   MS1: mixed solvent containing 1,3-dimethyl-2-imidazolidinone and cyclohexanone
   MS2: mixed solvent containing 1,3-dimethyl-2-imidazolidinone and cyclopentanone
   MS3: mixed solvent containing 1,3-dimethyl-2-imidazolidinone and isophorone
   MS4: mixed solvent containing 3-methoxy-N,N-dimethylpropanamide and cyclohexanone
   MS5: mixed solvent containing 3-methoxy-N,N-dimethylpropanamide and cyclopentanone
   MS6: mixed solvent containing 3-methoxy-N,N-dimethylpropanamide and isophorone
   MS7: mixed solvent containing 3-methoxy-N,N-dibutylpropanamide and cyclohexanone
   MS8: mixed solvent containing 3-methoxy-N,N-dibutylpropanamide and cyclopentanone
   MS9: mixed solvent containing 3-methoxy-N,N-dibutylpropanamide and isophorone
   MS10: mixed solvent containing γ-butyrolactone and cyclohexanone
   MS11: mixed solvent containing γ-butyrolactone and cyclopentanone
   MS12: mixed solvent containing γ-butyrolactone and isophorone.

13. The polyimide precursor composition according to claim 1, wherein the mixed solvent is one selected from the following mixed solvents MS1, MS3, MS4, MS6, MS7, MS9, MS10, and MS12,
   MS1: mixed solvent containing 1,3-dimethyl-2-imidazolidinone and cyclohexanone
   MS3: mixed solvent containing 1,3-dimethyl-2-imidazolidinone and isophorone
   MS4: mixed solvent containing 3-methoxy-N,N-dimethylpropanamide and cyclohexanone
   MS6: mixed solvent containing 3-methoxy-N,N-dimethylpropanamide and isophorone
   MS7: mixed solvent containing 3-methoxy-N,N-dibutylpropanamide and cyclohexanone
   MS9: mixed solvent containing 3-methoxy-N,N-dibutylpropanamide and isophorone
   MS10: mixed solvent containing γ-butyrolactone and cyclohexanone
   MS12: mixed solvent containing γ-butyrolactone and isophorone.

14. The polyimide precursor composition according to claim 1, wherein
   the polyimide precursor is formed from a polycondensate of tetracarboxylic dianhydride and a diamine compound, and
   a molar equivalent number of the diamine compound is greater than a molar equivalent number of the tetracarboxylic dianhydride.

15. The polyimide precursor composition according to claim 1, wherein the polyimide precursor contains a polyimide precursor having an amino group at a terminal.

16. The polyimide precursor composition according to claim 1, wherein a number average molecular weight of the polyimide precursor is equal to or greater than 2,000.

17. The polyimide precursor composition according to claim 1, wherein a content of the polyimide precursor is from 15% by weight to 25% by weight with respect to the polyimide precursor composition.

18. A method of preparing the polyimide precursor composition according to claim 1, the method comprising:
   performing polycondensation of tetracarboxylic dianhydride and a diamine compound in the mixed solvent containing the at least one organic solvent A and the at least one organic solvent B, to thereby obtain the polyimide precursor.

19. A method of preparing the polyimide precursor composition according to claim 1, the method comprising:
   polycondensing tetracarboxylic dianhydride and a diamine compound in the organic solvent A, and then adding the organic solvent B to the organic solvent A.

20. The polyimide precursor composition according to claim 1, wherein the ratio of the total amount of the organic solvent A and the total amount of the organic solvent B (total amount of the organic solvent A: total amount of the organic solvent B) is in a range of 9:1 to 5:5 in weight ratio.

21. A polyimide precursor composition, comprising:
a mixed solvent and a polyimide precursor dissolved in the mixed solvent, the mixed solvent containing at least one organic solvent A and at least one organic solvent B, wherein:

the organic solvent A is selected from the group consisting of an aprotic polar solvent which contains a nitrogen atom and a lactone solvent, and the organic solvent B is a non-aqueous solvent which has a carbonyl structure, a content of the polyimide precursor is from 15% by weight to 25% by weight with respect to the polyimide precursor composition, and the polyimide precursor includes a resin having a constituent unit represented by the following Formula (I-1), Formula (I-2), and Formula (I-3):

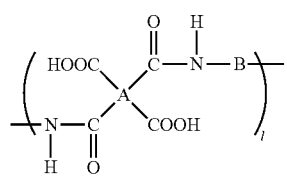
(I-1)

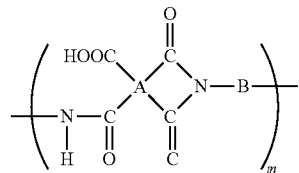
(I-2)

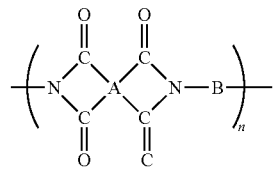
(I-3)

in which A indicates a tetravalent organic group; B indicates a bivalent organic group; and l, m, and n respectively indicate integers of 0 or more and satisfy the following relationship:

$(2n+m)/(2l+2m+2n) \leq 0.2$.

* * * * *